United States Patent [19]
Matsuo

[11] 3,737,578

[45] June 5, 1973

[54] PHASE SYNCHRONIZING CIRCUIT

[76] Inventor: Yoshio Matsuo, c/o Nippon Electric Co., Ltd., 7-15, Shiba Gochome, Minato-ku, Tokyo, Japan

[22] Filed: June 12, 1969

[21] Appl. No.: 832,711

[30] Foreign Application Priority Data

June 29, 1968 Japan ................................43/45467
Nov. 19, 1968 Japan ................................43/84390

[52] U.S. Cl. ........................178/67, 325/30, 325/320
[51] Int. Cl. ..............................................H04l 27/18
[58] Field of Search......................325/346, 419, 420, 325/349, 422, 423, 320; 329/50; 331/18, 25, 26, 28, 76; 178/66, 67, 88; 328/133, 134, 140, 141

[56] References Cited

UNITED STATES PATENTS

| | | | |
|---|---|---|---|
| 3,353,101 | 11/1967 | Kawai et al. | 325/320 |
| 3,518,680 | 6/1970 | McAuliffe | 178/88 X |
| 2,369,663 | 2/1945 | Dennis et al. | 331/26 |
| 3,196,369 | 7/1965 | Darden, Jr. et al. | 329/50 X |
| 3,065,427 | 11/1962 | Birdwell | 329/50 X |
| 3,100,871 | 8/1963 | Richardson et al. | 329/50 X |

*Primary Examiner*—Benedict V. Safourek
*Attorney*—Sandoe, Hopgood and Calimafde

[57] ABSTRACT

A phase synchronizing circuit comprises a voltage-controlled oscillator and a frequency multiplier for multiplying the output frequency of the oscillator by a factor corresponding to the number of phases in the input signal. A phase-difference detector receives both the input signal and the multipled frequency output and produces a d.c. signal representing the number of phases in the input signal.

7 Claims, 9 Drawing Figures

INVENTOR
YOSHIO MATSUO
BY
Sandoe, Hopgood and Calimafde
ATTORNEYS

INVENTOR
YOSHIO MATSUO
BY
Sandoe, Hopgood and Calimafde
ATTORNEYS

INVENTOR
YOSHIO MATSUO
BY
Sandoe, Hopgood and Calimafde
ATTORNEYS

PHASE SYNCHRONIZING CIRCUIT

This invention relates generally to a phase synchronizing circuit in a pulse code modulation communication system, and in particular, to a phase synchronizing circuit for obtaining a carrier required in demodulating a modulated signal by coherent detection.

There are two methods for the demodulation of a phase-modulated wave. One is a differential detection, and the other is a coherent detection. The former as compared to the latter, has defects in that the signals are affected by noise and transmission line characteristics. Coherent detection on the other hand requires a carrier at the receiving side of the communication system, therefore, insofar as any carrier information is not transmitted separately, such carrier must be detected out from an input signal at the receiving side. Methods used heretofore for detecting out the carrier are to remodulate the input signal or a detected out carrier, and to multiply the input signal. However, the circuits used for these methods are complicated and cannot be always applied in a high speed communication system.

The object of this invention is to provide a phase synchronizing circuit which can detect a carrier of the multi-phase phase-modulated signal in its simple circuiting formation.

In accordance with this invention, a phase synchronizing circuit comprises a voltage-controlled oscillator operative at a frequency-region around the carrier frequency of the input signal, a frequency multiplier for multiplying an output frequency of the voltage-controlled oscillator by a factor corresponding to the number of phases of said input signal, and a phase difference detector which is given said input signal and the output of said frequency multiplier, so that it outputs a D.C. signal according to the number of phases of said input signal.

Figure 1:
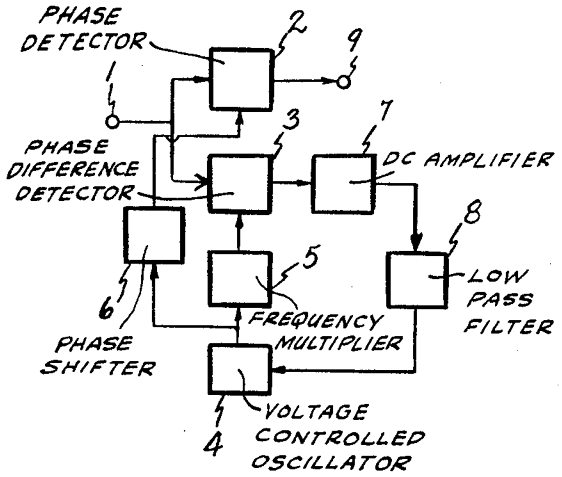
Figure 2:
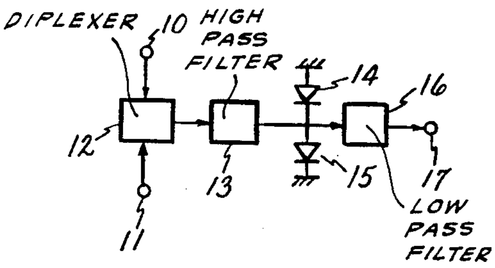
Figure 3:
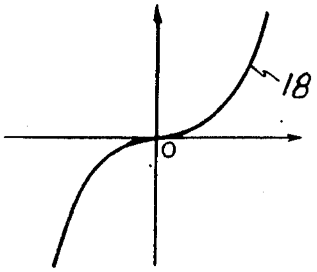
Figure 4:
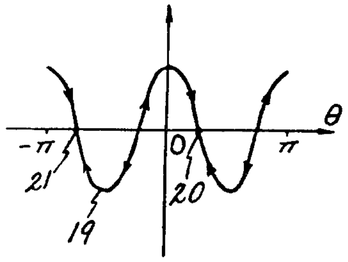
Figure 5:
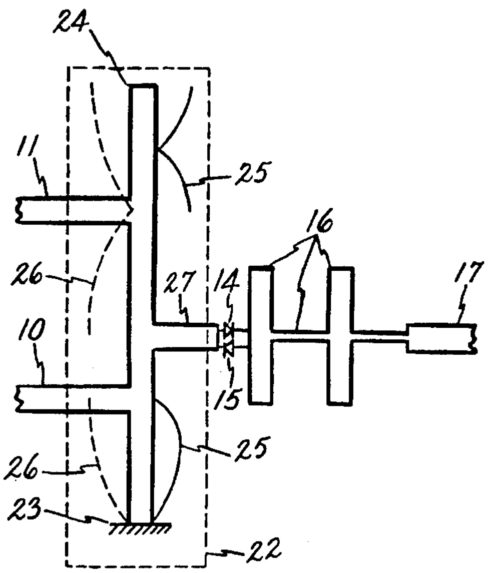
Figure 6:
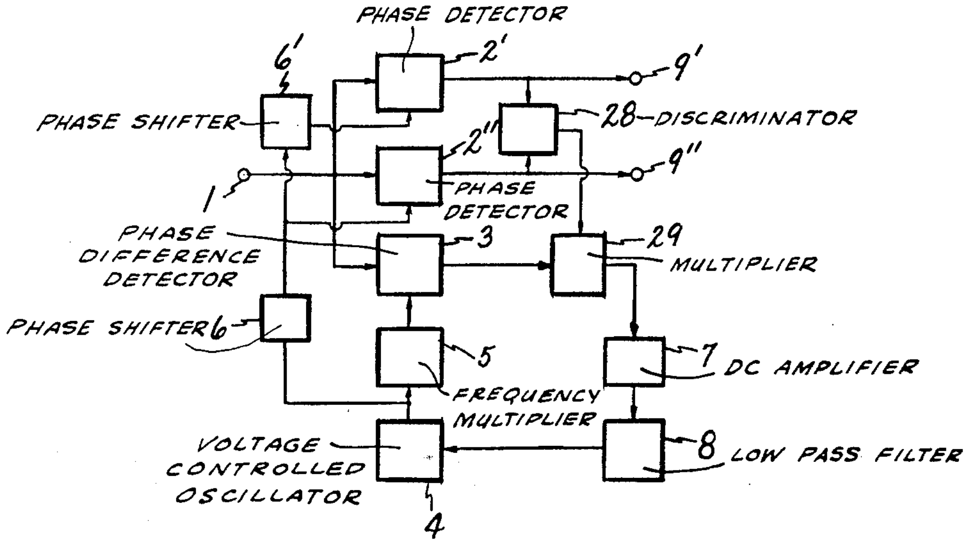
Figure 7:
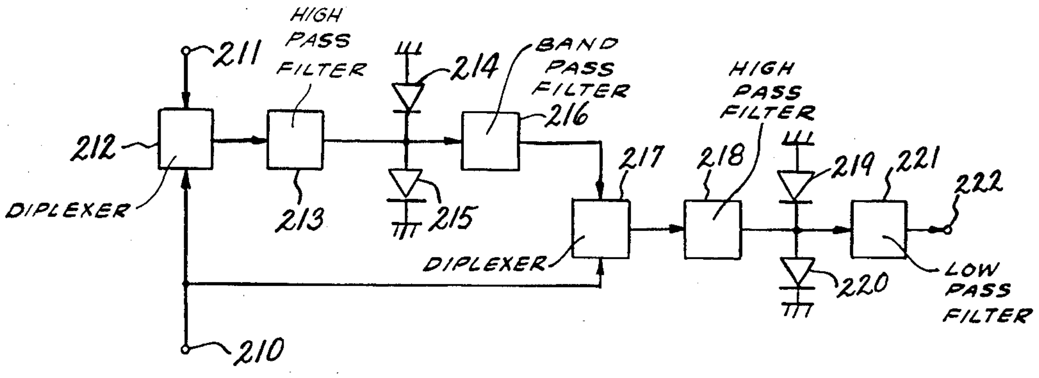
Figure 8:
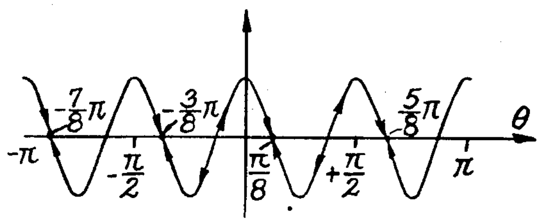
Figure 9:
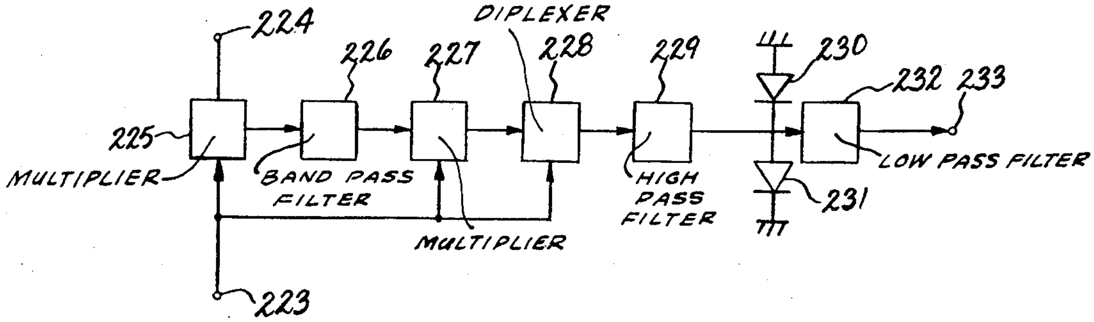

This invention will be explained in detail in relation to the annexed drawings; in which, FIG. 1 is a block-diagram illustrating the phase synchronizing circuit of this invention, FIG. 2 shows an example of a phase difference detector circuit of a member of this invention, FIG. 3 and FIG. 4 show performance characteristics of a phase difference detector circuit which is used in the case when the circuit of this invention is applied to the demodulation of the two-phase-modulated input signal, FIG. 5 is an embodiment of a phase difference detector which is formed with strip lines, FIG. 6 is a block diagram showing a formation of an embodiment in the case that the circuit of this invention is utilized to demodulate a four-phase-modulated input signal, FIG. 7 illustrates in block diagram form the formation of another embodiment in the case that this invention is applied to demodulate a multi-phase-modulated input signal, FIG. 8 illustrates the characteristics of the phase difference detector shown in FIG. 7, and FIG. 9 illustrates the formation of another embodiment in the case that multipliers are used for the phase difference detector according to this invention.

Relating to FIG. 1, 1 is an input signal terminal, 2 is a conventional phase detector, 3 is a phase difference detector which will be explained hereinafter, 4 is a voltage-controlled oscillator operative at a frequency region around the carrier frequency of the input signal applied to terminal 2, 5 is a frequency multiplier for multiplying by the factor equal to the number of phases of the input signal, 6 is a phase shifter, 7 is a D.C. amplifier, 8 is a low pass filter, and 9 is a phase detector output terminal.

In relation to the case of coherent detection of two-phase-modulated signal with the detected carrier, the output frequency of the oscillator 4 is doubled to have a frequency twice that of the carrier frequency of the input signal. That signal is supplied to the phase difference detector 3 together with the input signal. The phase difference detector 3 serves to produce an output signal, whose period is $\pi$, for a phase difference between the output of oscillator 4 and the carrier of the input signal.

An output signal corresponding to the phase difference between the carrier of the input signal and the output of oscillator 4, whose sign does not invert corresponding to the sign of input signal, is thus obtained regardless of whether the phase of the input signal is 0 or $\pi$. Accordingly, the carrier of the input signal and the output signal of oscillator 4 are maintained at a fixed mutual relation in which there is a constant phase difference therebetween by feeding back the output signal of the phase difference detector 3 through the D.C. amplifier 7 and the low pass filter 8 to control the output phase of the voltage controlled oscillator 4. Therefore, if the output phase of the oscillator 4 is made coincident with that of the carrier of the input signal by passing the oscillator output through the phase shifter 6 which can shift the phase by $-\pi/4$ as will become clear later, a coherent detection is performed by the phase detector 2 and a coherently detected output is obtained at the terminal 9.

As above mentioned, the feature of this invention is to comprise a phase difference detector 3 giving a D.C. signal having a period of $\pi$, in the case that the input signal is a two-phase-modulated wave, to the voltage-controlled oscillator 4, the phase of the oscillating frequency of which is controlled in accordance with the negative or positive of the output of phase difference detector 3 so as to be a constant phase difference.

Further, the oscillating frequency of voltage-controlled oscillator 4 is applied to phase difference detector 3 after being multipled by two, so that the sign of the D.C. signal of the output of phase difference detector 3 does not invert with the variation of 0 or $\pi$ of the input signal.

The construction and the operation of the aforementioned phase difference detector 3 are explained in detail with reference to FIGS. 2, 3 and 4. FIG. 2 shows the formation thereof, in which 10 is an input terminal for the input signal. 11 is an input terminal for the frequency multiplier output, 12 is a diplexer for adding said both signals, 13 is a high pass filter, 14 and 15 are semiconductor diodes, 16 is a low pass filter, and 17 is an output terminal of said phase difference detector. The input signal and the output signal of frequency multiplier 5 whose frequency is twice of that of input signal are applied to said diplexer 12 through the terminals 10 and 11, respectively, so that they are added to each other therein. The resultant composite signal is applied to the semiconductor diodes 14 and 15 through said high pass filter 13. The diplexer 12 is used to prevent the signals supplied to the input terminals 10 and 11 from leaking to the other input terminals 11 and 10, respectively, and to supply the input signals to the diodes 14 and 15 through the high-pass filter 13.

The semiconductor diodes are connected in parallel with each other in reverse polarity to the signal transmission line, as shown in FIG. 2, and a define circuit having non-linear voltage current characteristics, so that detection can be performed therein due to this non-linear characteristics.

The output detected therein is derived at terminal 17 through low pass filter 16 and is applied to the voltage controlled oscillator 4 through the D.C. amplifier 7 and the low pass filter 8 which are shown in FIG. 1.

The output obtained at the terminal 17 is the above mentioned phase difference signal. The relation of the phase difference signal to the phase difference of the two inputs may now be explained.

FIG. 3 shows a voltage-current characteristics 18 of the reversely connected parallel diodes 14 and 15 and this is represented approximately as follows:

$$i = aV^3 \qquad (1)$$

where $V$ is the voltage, $i$ is the current and $a$ is a proportional constant. Now, the input signal $V_s$ is represented as $$V_s = A \cos 2\pi ft \qquad (2)$$

where $A$ is an amount of value +1 or −1 depending upon the information transmitted, $f$ is the carrier frequency and $t$ is time. The output $V_o$ of the oscillator 4 in FIG. 1 is represented as $$V_o = \cos (2\pi ft + \theta) \qquad (3)$$

where $\theta$ is the phase difference between the oscillator output and the carrier of the input signal. The oscillating output $V_o$ is doubled by the frequency multiplier 5 and therefore the voltage $V_m$ to be applied to the input terminal 11 of phase difference detector 3 becomes $$V_m = \cos (4\pi ft + 2\ \theta) \qquad (4)$$

In this expression, a proportional constant of amplitude is omitted to clarify the equation. This is done similarly hereinafter. Therefore a voltage $V$ which is obtained from diplexer 12 and applied to diodes 14 and 15 becomes $$V = V_s + V_m = A\cos 2\pi ft + \cos (4\pi ft + 2\theta). \qquad (5)$$

Therefore, from the equations (1) and (5), a D.C. component $idc$ of a current flowing to the diodes 14 and 15 is represented as follows:

$$idc = 3/2\ aA^2 \cos 2\theta \qquad (6)$$

An output signal proportional to the current represented by said equation (6) is obtained at the terminal 17 through low pass filter 16 as the output of phase difference detector 3. The relation of this output signal to phase difference $\theta$ is shown by a curve 19 in FIG. 4. As will be clear from the equation (6) the relation of the output signal to phase difference $\theta$ is not varied with the value of A. which is +1 or −1, and has the period $\pi$ to $\theta$. Therefore the output signal whose polarity is not varied can be obtained from phase difference detector 3 even if the phase of the input signal is either 0 or $\pi$. In short, the diodes 14 and 15 connected antiparallel having the voltage-current characteristic approximately given by equation (1) are supplied with the input signals represented by equation (2) and (4) to derive an output signal whose D. C. component is proportional to $\cos 2\theta$ as given by equation (6). Qualitatively, the level of the D. C. output derived from the diodes 14 and 15 is given by a mathematical function of the phase difference between the input signal given by equation (2) and the oscillator output signal given by equation (3). In other words, the circuit comprising the diodes 14 and 15 operates as a phase difference detector. Phase difference $\theta$ is varied along the curve 19 in the arrow direction by controlling the oscillator 4 in such a manner that phase difference $\theta$ is increased when the output of the phase difference detector 3 is positive, and that phase difference $\theta$ is decreased when negative, so that it becomes stable at a point 20 or 21 which corresponds to $\theta = \pi/4$ or $-3\pi/4$ respectively. That is, the stable phase of phase difference $\theta$ is $\pi/4$ or $-3\pi/4$. It is determined by an initial condition when the synchronization is achieved which values of $\pi/4$ or $-3\pi/4$ phase difference $\theta$ takes. When the stable phase of phase difference $\theta$ is $\pi/4$ in the initial condition, the output signal whose phase progresses by $\pi/4$ more than the input signal is derived from voltage-controlled oscillator 4, and the phase of output signal is shifted by $-\pi/4$ in said phase shifter 6, so that the signal from phase shifter 6 is given to the phase detector 2 for coherent detection. When the stable phase of the phase difference $\theta$ is $-3\pi/4$ in the initial condition, the phase of the output signal derived from the phase shifter 6 is in phase opposition to the carrier of the input signal. The phase ambiguity between two discrete values of 0 and $\pi$ of the signal supplied to the phase detector 2, however, does not matter at all in differential phase modulation, as described in W. R. Bennett and J. R. Davey, "Data Transmission," published by McGraw Hill, New York, N. Y. 1965, pp. 204–208, which is generally used in a phase-modulation communication system.

According to above mentioned formations, the phase synchronizing circuit for detecting the carrier required for the coherent detection of the two phase-modulated wave can be obtained.

An embodiment of the phase difference detector using strip lines will be explained. Referring to FIG. 5. 10 is an input terminal for a signal whose frequency is $f$, 11 is an input terminal for a signal whose frequency is 2f, a portion 22 has the same function of the combination of the diplexer 12 and high pass filter 13 which are shown in FIG. 2, 23 is a short-circuited termination and 24 is an open-circuited termination. Standing waves on this circuit for the signals of frequencies 2f and f are shown by a curve 25 and a dotted curve 26 respectively. As will be clear from this figure, those two input signals are added without affecting each other and the added signal is derived at a terminal 27. More particularly, the standing wave 26 produced by the input signal of the frequency $f$ supplied to the input terminal 10 has a node or short circuit at the branch point for the other input terminal 11, and a loop or open circuit at the branch point for the output terminal 27. Therefore, the signal of the frequency $f$ does not leak to the other input terminal 11 but is substantially entirely delivered to the output terminal 27. Likewise, the signal supplied to the other input terminal 11, whose frequency is an integral multiple of the frequency $f$ of the signal supplied to the input terminal 10, is substantially wholly delivered to the output terminal 27, to be added to the signal of the frequency $f$. Said added signal is detected by the parallel circuit of diodes 14 and 15, and, thereafter, the D.C. component $i_{dc}$, which is represented by the equation (6), is obtained from the output terminal 17 through the low pass filter 16. In FIG. 5, a D.C. return path of the diodes is provided by the short-circuited termination 23.

Referring now to FIG. 6, an embodiment in which the circuit of this invention is applied to a demodulation circuit for a four phase phase-modulated wave is explained. The constructive elements 1,3,4,5,6,7 and 8 are identical to those in FIG. 1, 2′ and 2″ are phase detectors, 6′ is a phase shifter for shifting a phase by $\pi/2$, 9′ and 9″ are coherent detector outputs, 28 is a discriminator circuit capable of producing an output signal either of two polarities depending upon difference of the sign of the coherent detector outputs 9′ and 9″ (producing a positive or a negative output when the coherent detector outputs 9′ and 9″ are discriminated to be of the same polarity, and the output signal of the opposite polarity when the outputs 9′ and 9″ are discriminated to be of the opposite polarities), and 29 is a multiplier circuit for multiplying the output of the discriminator 28 by the output of the phase difference detector 3. The output from phase difference detector 3 for the four phase phase-modulated wave is the signal having a constant sign for $\theta$, when the phase of the input signal is 0 or $\pi$. And when the phase of the input signal is $\pm \pi/2$, said output signal is the signal having an inverted sign, and is represented as $i_{dc} = -3/2\ aA^2\cos 2\theta$. Therefore, by discriminating the received phase by the discriminator 28, and inverting the sign of the output of the phase difference detector 3 in the multiplier 29 according to the output of said discriminator, for example, in the case of $\pm \pi/2$, an output having a constant relation to the phase difference between the input signal carrier and the output of the oscillator 4 is obtained at the output terminal of said multiplier 29.

As is clear from the above descriptions, the circuit system formations illustrated in FIG. 6 serves as a phase synchronizing circuit in the same manner as in the two phase circuit described above.

In the above descriptions, embodiments of a phase synchronizing circuit having a phase difference detector as shown in FIG. 2 are explained, but other phase difference detectors can be used for detecting a carrier and coherent detection.

FIG. 7 shows an embodiment of a four phase difference detector is. This phase difference detector composed of two phase difference detectors as shown in FIG. 2 which are connected to each other in cascade. This phase difference detector, may be used for block 3 in FIG. 1 so as to form a phase synchronizing circuit. The phase shift in phase shifter 6, and the factor of multiplying in the frequency multiplier 5 are different from those in the above described two phase phase-modulated wave. The phase shift introduced by the phase shifter 6 is $\pi/8$ and the frequency multiplication carried out by the frequency multiplier 5 is four.

Referring to FIG. 7, 210 is an input terminal for an input signal, 211 is an input terminal of the multiplier, 212 is a diplexer, 213 is a high pass filter, 214 and 215 are semiconductor diodes, 216 is a band pass filter, 217 is a diplexer, 218 is a high pass filter, 219 and 220 are semiconductor diodes, 221 is a low pass filter and 222 is an output terminal for the output signal.

A four phase phase-modulated wave from an input terminal 210 and the signal from a frequency multiplier input terminal 211, whose frequency corresponds to four times the output frequency of the voltage controlled oscillator, are added in diplexer 212 and, thereafter, supplied to the semiconductor diodes 214 and 215 through high pass filter 213. Semiconductor diodes 214 and 215 form a non-linear element circuit having a substantial cubed characteristics as shown in FIG. 3. The output signal detected at diodes 214 and 215 is supplied to band pass filter 216 to select a frequency component of twice the carrier frequency of the input signal, and, thereafter, supplied to diplexer 217 together with the four phase phase-modulated wave. A described D.C. component is derived by passing the resultant added signal from diplexer 217 through high pass filter 218, the non-linear element circuit 219, 220 and the low pass filter 221.

The operation of this phase difference detector will be explained in detail.

The voltage-current characteristics of the circuit composed of the non-linear diodes 214 and 215 can be approximately represented as the following equation, approximately:

$$i = aA^3 \tag{7}$$

where, $a$ is a proportional constant. The input signal is $$V_s = A\cos 2\pi ft \tag{8}$$

where A can take +1, −1, $+j$ or $-j$ ($J$ is the imaginary unit) according to a transmitted information, f is a carrier frequency and $t$ is time.

The oscillation output $V_o$ of the voltage controlled oscillator 4 is represented as follows:

$$V_o = \cos(2\pi ft + \theta) \tag{9}$$

where, $\theta$ is a phase difference between the carrier of the input signal and an oscillator output. And the voltage provided at the terminal 211, whose frequency is multiplied by four in the frequency multiplier, is $$V_m = \cos(8\pi ft + 4\theta) \tag{10}$$

Therefore a voltage $V$ to be applied to the diodes 214 and 215 becomes $$V = V_s + V_m = Acos\ A\cos ft + \cos(8\pi ft + 4\theta) \tag{11}$$

and current $i_{4\pi f}$ of the frequency component of twice of the carrier frequency in this output becomes as follows:

$$i_{4\pi f} = -3/2\ a \cdot A^2 \cos (4\pi ft + 4\theta) \quad (12)$$

This output component is derived from the band pass filter 216, added again with the input signal in the diplexer 217 and supplied to the non-linear diodes 219 and 220 having the previously mentioned characteristics the D.C. component $i_{dc}$ of a current flowing through this circuit is represented as $$i_{dc} = 9/4 \cdot a \cdot A^4 \cdot \cos 4\theta \quad (13)$$

and an output signal proportional to the equation (13) is obtained at a terminal 222 through the low pass filter 221.

This is shown in FIG. 8 which the output has a period $\pi/2$ for $\theta$, and this is not varied as will be clear from the equation (13), whichever values of $+1, +j, -1$ or $-j$ A may take. Therefore a discriminator and a multiplier such as in the circuit of FIG. 6 are unnecessary. The output becomes stable at values of $\theta$ of $-7\pi/8$, $-3\pi/8$, $\pi/8$ and $5\pi/8$ respectively, by controlling in such manner that $\theta$ is increased when the output of the phase difference detector is positive, and that $\theta$ is decreased when that output is negative, as shown in FIG. 8.

It is determined by the initial conditions which output takes these stable phases. Accordingly, the carrier can be detected by shifting the phase by the phase difference determined by the initial conditions (the phase difference $\pi/8$, in this case) in the phase shifter 6, and the coherent detector is performed by adding to the coherent detector 2 the output of phase shifter 6 and said input signal. The phase ambiguity of $\pi/4$, $3\pi/4$, $-\pi/4$, and $-3\pi/4$ introduced by the difference in the initial conditions into the output of the phase shifter 6 does not adversely affect the performance. The coherent detector 2 for the four-phase phase modulation is a four-phase coherent detector.

A phase difference detector as shown in FIG. 9 can be formed, which comprises the combination of a multiplier circuit and semiconductor diodes, as a modification of the above described phase difference detector for a phase synchronizing circuit for the demodulation of a four phase phase-modulated wave.

Referring now to FIG. 9, 223 is a input terminal for an input signal, 224 is a frequency multiplier input terminal, 225 is a multiplier, 226 is a band pass filter, 227 is a multiplier, 228 is a diplexer, 229 is a high pass filter, 230 and 231 are semiconductor diodes, 232 is a low pass filter, and 233 is an output terminal of the phase difference detector.

The input signal from the input terminal 223, which is represented by the equation (8), and the multiplier output signal from the terminal 224 which is represented by the equation (10), are multiplied in the multiplier 225, The multiplied signal is passed through band pass filter 226 and, as a result, a frequency component $J_{6\pi f}$ which is three times the carrier frequency is obtained.

$$i_{6\pi f} = A/2 \cos (6\pi ft + 4\theta) \quad (14)$$

a frequency component $i_{4\pi f}$ which is twice the carrier frequency is obtained by multiplying again the output signal component $i_{6\pi f}$ of the equation (14) by the input signal in the multiplier 227.

$$i_{4\pi f} = A^2/4 \cos(4\pi ft + 4\theta) \quad (15)$$

A D.C. component $i_{dc}$ is produced on the output signal from non-linear diodes 230, 231 by adding the output signal component in the equation (15) and the input signal in diplexer 228 and supplying the added signal to the non-linear diodes 230,231 through a high pass filter 229.

$$i_{dc} = 3/8\ A^4 \cos 4\theta \quad (16)$$

In this circuit, a D.C. signal can be obtained from the output terminal 233, which is constant in its sign whichever the input signal may take $+1, +j, -1$ or $-j$, and which has a period $\pi/2$ for $\theta$, as in the embodiment as shown in FIG. 7, and the oscillation phase of the voltage controlled oscillation can be controlled by his D.C. signal. The diplexer 228 serves to obviate the leakage of the input signal supplied to each of the input terminals to the other terminal and to supply both input signals to the high-pass filter 229. The low-pass filter 232 serves to derive the D. C. component of the signal developed at the junction of the diodes 230 and 231.

As above described, each of embodiments of FIG. 7 and FIG. 9 can give a control signal which has a period $\pi/2$ for $\theta$ and which has no relation to the value of A of the input four phase phase-modulated wave as the output of the phase difference detector.

The phase difference detector for three phase phase-modulated wave can be easily formed to give a control signal corresponding to $A^3\cos 3\theta$ in a similar manner, and, furthermore, the phase difference detector for n phase phase-modulated wave can be easily formed, so that n phase synchronizing circuit can be obtained by this invention.

Regarding the non-linear element, it has been explained that two semiconductor diodes are connected to the transmission line in parallel with reverse polarity to each other, but other elements having approximate cubed characteristics, such as a back diode, can be used.

Furthermore, there is a modification that the resultant signal of the input signal and the multiplier output signal may be detected in two non-linear element circuits repectively, thereafter both signals being added so that a phase difference signal in proportion to $A^n\cos\theta$ is obtained.

This invention has been explained in connection with several particular embodiment for convenience of explanations, but this invention should not be restricted to the embodiments, and other changes and modifications can be made within the scope of this invention.

I claim:

1. A phase synchronizing circuit comprising an input for receiving a polyphase phase-modulated input signal, a voltage controlled oscillator oscillating at the frequency region around the carrier frequency of the input signal, a frequency multiplier coupled to the output of said oscillator for multiplying the output frequency of said oscillator by a positive integer to produce a frequency multiplied signal, means having a first input terminal connected to the output of said frequency multiplier and receiving said frequency multiplied signal thereat, a second input terminal coupled to said input for receiving said input signal thereat, and an output terminal for detecting the phase difference of said frequency multiplied signal and said input signal to derive at said output terminal a D.C. signal representative of the phase difference between said input signal and said frequency multiplied signal without multiplying the frequency of said input signal, and means coupled to said output terminal of said signal processing means and responsive to said D.C. signal for controlling the output signal of said oscillator.

2. The phase synchronizing circuit of claim 1, in which said frequency multiplier comprises means for multiplying the output frequency of said oscillator by a factor of two, said phase difference detecting means comprising a diplexer for adding said input signal and the output signal of said frequency multiplier, and a non-linear element circuit having an approximate cubed characteristic and operatively connected to the output of said diplexer.

3. The phase synchronizing circuit of claim 1, in which said phase difference detecting means comprises a diplexer for adding the input signal and the frequency multiplier output, first and second semiconductor diodes connected to the output of said diplexer in parallel with reverse polarity to one another, and a low pass filter responsive to the signal appearing at the junction of the output of said diplexer, said first and second diodes, and the input of said low pass filter for deriving said D.C. signal.

4. The phase synchronizing circuit of claim 1, further comprising first means coupled to said oscillator for producing two phase shifted output signals that are in phase quadrature relation to each other, first and second phase detectors responsive to said input signal and said phase shifted output signals for detecting the in-phase component and the quadrature component of said input signal to thereby produce phase detector output signals, respectively, and second means responsive to the outputs of said first and said second detectors for producing an output signal of either polarity depending on the respective polarities of said first and said second phase detector output signals, said output frequency controlling means comprising means for multiplying the output of said second output signal producing means by said D.C. signal, and means for applying the output of said multiplier to said voltage controlled oscillator.

5. The phase synchronizing circuit of claim 1, in which said frequency multiplier comprises means for multiplying the oscillating frequency from said vol-age controlled oscillator by a number corresponding to the number of the phase states that are taken by said input signal, said phase difference detecting means including at least two diplexers and at least two non-linear element circuits, each of which has an approximate cubed characteristic.

6. The phase synchronizing circuit of claim 1, in which said frequency multiplier comprises means for multiplying the oscillating frequency from said voltage controlled oscillator by a number corresponding to the number of the phase states that are taken by said input signal, said phase difference detecting means including means for multiplying said input signal and said frequency multiplied signal.

7. The phase synchronizing circuit of claim 6, in which said signal processing means further comprises at least one non-linear circuit element.

* * * * *

UNITED STATES PATENT OFFICE
CERTIFICATE OF CORRECTION

Patent No. 3,737,578 Dated June 5, 1973

Inventor(s) Yoshio Matsuo

It is certified that error appears in the above-identified patent and that said Letters Patent are hereby corrected as shown below:

IN THE CAPTION:

The Assignee should be noted as follows:

--Assignee: Nippon Electric Company, Limited
Tokyo, Japan--

IN THE CLAIMS:

Column 10, Claim 5, line 18, "vol-age" should be --voltage--.

Column 10, Claim 7, line 35, "signal processing" should be --phase difference detecting--.

Signed and sealed this 1st day of January 1974.

(SEAL)
Attest:

EDWARD M.FLETCHER,JR.
Attesting Officer

RENE D. TEGTMEYER
Acting Commissioner of Patents

FORM 1050 (10-69)

USCOMM-DC 60376-P69
U.S. GOVERNMENT PRINTING OFFICE 1969 O—366-334